Feb. 3, 1948.                C. W. SADLER                2,435,368
                               CLUTCH
                        Filed March 12, 1945
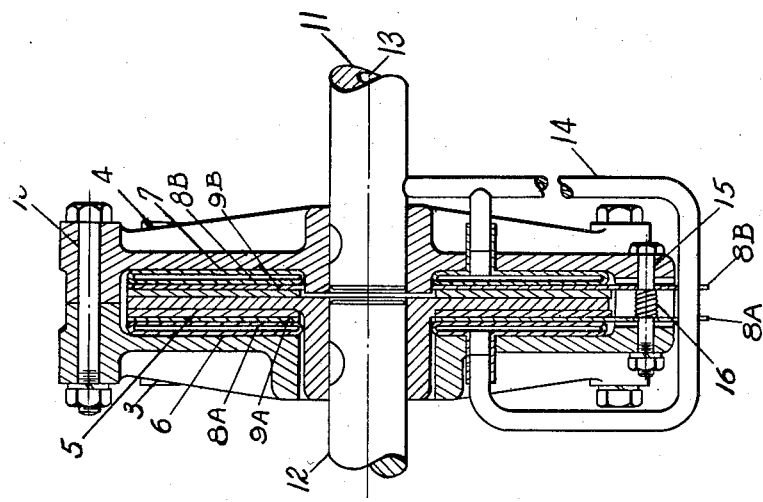
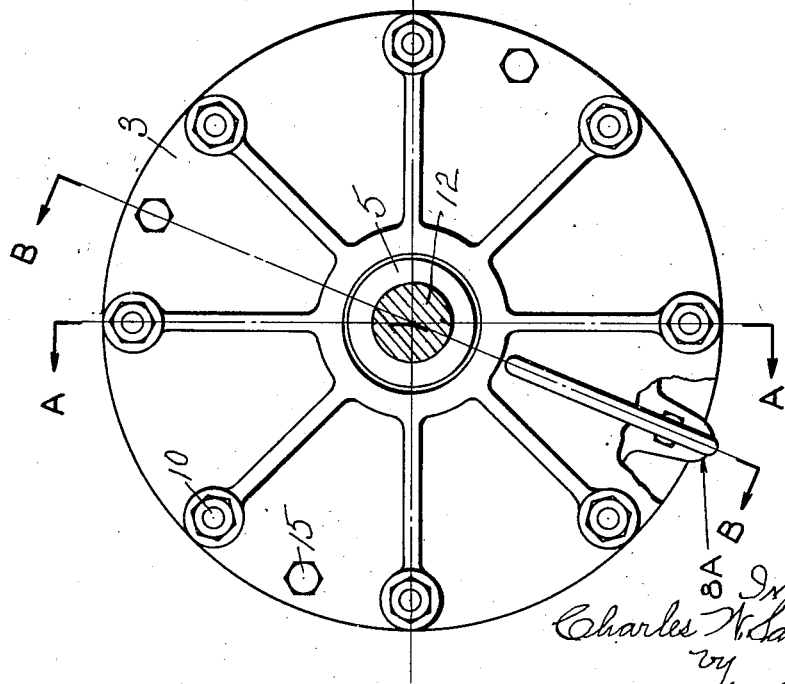

Patented Feb. 3, 1948

2,435,368

UNITED STATES PATENT OFFICE 2,435,368

CLUTCH

Charles W. Sadler, Essex, Conn.

Application March 12, 1945, Serial No. 582,270

4 Claims. (Cl. 192—85)

My invention relates to the class of clutches which are more particularly adapted for use in producing a friction drive suitable for pleasure cars, trucks, boats and the like, and an object of my invention, among others, is the production of a clutch of this type that will give full efficiency with little shock and to supersede the so-called "fluid drive."

One form of a clutch embodying the invention and in the construction and use of which the objects herein set out, as well as others, may be attained is illustrated in the accompanying drawings, in which—

Figure 1 is a face view of one side of my improved clutch.

Figure 2 is a view in section above the center line in a plane denoted by the broken line A—A and below the center line on a plane denoted by the dotted line B—B.

In the accompanying drawings the numeral 3 denotes one half of a housing and 4 denotes the other half that is keyed to a shaft 11, the part 3 of the housing being firmly secured to the half 4 by means of bolts 10. The numeral 5 denotes a driving disk located within the structure and having a hub extending through an opening in a hub of the part 3 of the housing, as shown in Fig. 2 of the drawings. This disk 5 is keyed to a driving shaft 12 that may be the driving shaft of the motor in connection with which the clutch is used. The numerals 6—7 denote expandable rubber disks or tubes of circular shape located on opposite sides of the disk 5 and connected with air pressure to be hereinafter described. Circular buffer disks 8A—8B, which separate the rubber tubes from non-metallic friction washers, are located between said tubes and said washers, as shown in Fig. 2 of the drawings. These disks are carried loosely by four bolts 15 equally spaced around the structure and each plate has projections slotted to straddle the bolts 15, one of these projections extending beyond the bolts to support the air tube 14 as shown in Fig. 2. 9A and 9B are non-metallic friction washers loosely mounted in the structure on opposite sides of the disk 5 hereinbefore referred to and between said disk and the metal plates 8A—8B.

As hereinbefore mentioned the halves 3—4 of the housing are firmly joined by the bolts 10. Upon the driving shaft 12 being rotated, pressure is applied within the rubber tubes 6—7, thereby expanding said tubes and pressing all of the parts contained within the chambers in the sections 3—4 of the clutch into close engagement with each other and with the walls of said chamber. This causes the driven shaft 11 to be rotated with a yielding frictional drive.

The shaft 11 has an air passage 13 which is connected with the pressure system of the motor in connection with which the clutch is used and which system is employed to supply pressure through the tube 14 to the circular rubber tubes hereinbefore referred to, the pressure being controlled by any suitable means common to structures of this class and which are not therefore illustrated and described in detail herein.

The numeral 16 denotes a spiral spring of which there are four. When the air pressure is released these springs force the buffer disks away from the nonmetallic friction washers, thereby eliminating friction.

I claim:

1. A clutch of the character described comprising a housing having a chamber therein and secured to a driven shaft, a driving disk contained within said housing and having a hub extending therethrough, a driving shaft secured to said hub, a nonmetallic friction disk contained loosely within said chamber at each side of said driving disk, an expansible disk shaped member contained within said chamber between each of said friction disks and the walls of said chamber, a buffer disk between each of said expansible disks and friction disks and secured to said housing for rotation therewith, the said driven shaft having a passage therein, and means communicating said passage with said expansible disks.

2. A clutch of the character described comprising a housing having a chamber therein, a driven shaft keyed to said housing, a driving disk in said chamber, a hub on said disk extending through said housing, a driving shaft keyed to said hub, a pair of friction disks disposed one at each side of said driving disk, expansible disks between each of said friction disks and a wall of said chamber, a buffer disk between each of said expansible disks and one of said friction disks; the said buffer disks being keyed to said housing for rotation therewith, means for communicating pressure to said expansible disks, and means for urging said buffer disks away from the said driven disk for releasing pressure between said friction disks and driven disk.

3. A clutch of the character described comprising a housing having a driven shaft keyed thereto, a chamber within said housing, a driving disk in said chamber, a driving shaft keyed to said driving disk, a pair of friction disks loosely in said chamber and one at each side of said driving disk, an expansible disk between each of said friction disks and a wall of said chamber, a buffer disk between each of said expansible disks and its respective friction disk, a plurality of bolts extending through said housing and connecting said buffer disks thereto for rotation therewith, a spring on each of said bolts, between said buffer disks, urging them to remove pressure between said friction disks and driving disk, and means for supplying pressure to said expansible disks.

4. A clutch of the character described comprising a housing having a chamber therein and a driven shaft keyed thereto, a driving disk in said chamber, a driving shaft keyed to said disk, a pair of friction disks loosely in said chamber one at each side of said driving disk, an expansible disk between each of said friction disks and a wall of said chamber, means for communicating pressure to each of said expansible disks; said means including a co-axial passage in the driven shaft, a conductor tube exteriorly of said housing and extending to the opposite sides thereof, and connections between said tube and each of said expansible disks extending through the walls of said chamber.

CHARLES W. SADLER.

REFERENCES CITED

The following references are of record in the file of this patent:

UNITED STATES PATENTS

| Number | Name | Date |
| --- | --- | --- |
| 1,137,944 | Allen | May 4, 1915 |
| 1,564,717 | Scruby et al | Dec. 8, 1925 |

FOREIGN PATENTS

| Number | Country | Date |
| --- | --- | --- |
| 687,280 | Germany | Jan. 26, 1940 |